United States Patent [19]

Eriksson

[11] Patent Number: 4,561,895
[45] Date of Patent: Dec. 31, 1985

[54] NON-ABRASIVE METAL CLEANING AGENT

[76] Inventor: Jan-Olof Eriksson, Torget 4, S-931 31 Skellefteå, Sweden

[21] Appl. No.: 557,171

[22] PCT Filed: Mar. 8, 1983

[86] PCT No.: PCT/SE83/00075
§ 371 Date: Nov. 9, 1983
§ 102(e) Date: Nov. 9, 1983

[87] PCT Pub. No.: WO83/03253
PCT Pub. Date: Sep. 29, 1983

[51] Int. Cl.$^4$ .............................................. C09G 1/18
[52] U.S. Cl. ......................................... 106/3; 252/101; 252/102; 252/142; 252/541
[58] Field of Search ................... 106/3; 252/101, 102, 252/142, 541

[56] References Cited
U.S. PATENT DOCUMENTS 2,132,511 10/1938 Hentrich et al. .
3,196,113 7/1965 Ponchel ................................. 252/101
3,228,816 1/1966 Kendall ............................ 204/129.95
4,397,753 8/1983 Czaja .................................... 252/142

FOREIGN PATENT DOCUMENTS 968189 1/1958 Fed. Rep. of Germany .
722255 1/1955 United Kingdom .

Primary Examiner—Lorenzo B. Hayes
Assistant Examiner—Amelia B. Yarbrough
Attorney, Agent, or Firm—Nils H. Ljungman

[57] ABSTRACT

The present invention relates to a non-abrasive metal polish or cleaning agent for objects, particularly household objects and ornaments, having surfaces of copper, silver, or chromium or of any alloy which is comprised of these metals either separately or together. The polish is characterized in that it comprises an aqueous solution containing 1–3% by weight nitric acid and 5–10% by weight thiourea or a derivative thereof.

2 Claims, No Drawings

NON-ABRASIVE METAL CLEANING AGENT

The present invention relates to a non-abrasive metal polish or cleaning agent for objects, particularly for cleaning and shining household objects and ornaments, which objects have surfaces of copper, silver or chromium or of any alloy which is comprised predominantly of any of these metals, either separately or together.

Objects which have copper, silver or chromium surfaces and which are exposed to contaminated air, for example air in large built-up areas or industrial areas, or in the vicinity of such areas, quickly become coated with a discoloring film of various reaction products. At first, this film dulls the surfaces of the objects, and then changes their color to a darker hue.

It has long been usual to polish household objects having copper and silver surfaces and also different chromium-coated objects, with one abrasive-containing polish or the other, the discoloring film being worn away to a greater or lesser extent, often together with a relatively substantial layer of the actual surface metal. In addition to an abrasive, these polishes often contain dissolving agents, such as ammonia water or carboxylic acid. For example, SE-C-167770 describes a polish or cleaning agent in paste form in which the dissolving agent is sulphuric acid and which also contains a thiourine substance, which is said to act as a reductant which facilitates removal of oxide films. In SE-C-196019 there is described a polish in which the dissolving agent used is carbonic acid. This gives the polish a better effect, especially on silver surfaces, which grow dull when using polishes based on sulphuric acid. One serious disadvantage with carbonic-acid based polishes, is that the metal surfaces must be rubbed vigorously, particularly in the case of heavily tarnished surfaces.

In recent years polishes of the aforementioned kind have been proposed which lack any form of abrasive and which, in liquid form, are applied to the metal surfaces and there left for a certain length of time, whereafter the polish is rinsed from the surfaces with water, optionally together with a detergent. One such liquid polish, which is based on phosphoric acid, is today sold for polishing silver surfaces. According to the treatment prescribed, the silver surfaces are first immersed in the polish solution, and then removed and rinsed. One disadvantage with this polish is that if highly polished, relatively resistant surfaces are desired, it is restricted to silver surfaces. Another, more serious disadvantage is that the length of time over which the object is immersed is critical, since excessive immersion times have negative secondary effects, which mainly manifest themselves in the form of irregular surface finishes. By polish is meant in this case a shine-improving agent requiring no abrasive. Another commercially available polish of this kind, intended for copper, is based on oxalic acid in combination with a detergent. This polish has a limited use, and can only be used satisfactorily on copper surfaces which are only slightly discolored.

It has now been found to produce a metal cleaning agent which is capable of producing highly polished surfaces while escaping the disadvantages and limitations associated with known polishes of this kind. The invention is based on the surprising synergistic effect obtained when the dissolving agent used in the cleaning agent or polish is nitric acid and when an inhibiting component of thiourea thereof is present at the same time, in a weight surplus relative to the acid. The polish according to the invention is characterized in that it comprises an aqueous solution containing 1-3% by weight nitric acid and 5-10% by weight of thiourea or a derivative thereof. The amount of nitric acid above is calculated as 100% $HNO_3$, and hence the amount of nitric acid charged must be adapted to the concentration of the acid. Thus, in order to obtain the desired concentration, 20 ml of concentrated nitric acid must be added to 1000 ml of water.

At nitric acid concentrations beneath about 1% by weight, the dissolving effect is substantially lowered, while at concentrations above 3% by weight, the dissolving effect begins to be troublesome, even when an increased amount of organic substance is used. The organic-substance concentration is also critical, and contents beneath 5% by weight result in the undesirable dissolving of the metal, while contents above about 10% by weight have no additional effect whatsoever, since the solution is then saturated, and hence any excess is quite without effect, both economically and technically.

The good effect obtained with the polish according to the invention must be ascribed to the surprising positive co-action between the specific dissolving component active in the polish, and the weight-surplus amount of the organic sulphur and nitrogen compound added thereto; in this respect thiourea type compounds have been found particularly effective. This could be due to the comparatively superior chemical ability of nitric acid to dissolve such discoloring coatings on metal surfaces as coating of oxidic sulphate, carbonates or sulphides forming on copper, silver and chromium surfaces. The acid is relatively inert with respect to the actual metal itself, so as to be more favorable to the metal than are previously known polishes, which should be particularly obvious since the polish contains no abrasive substances capable of attacking the metal when using the polish.

When manufacturing the polish according to the invention, the component is first stirred into a suitable quantity of water, the water having a temperature of about 60° C. When the organic substance has dissolved completely, the acid is added.

EXAMPLE

For the purpose of comparing the effect obtained with known polishes with the effect obtained with the polish or cleaning agent according to the invention in treating copper objects discolored to varying extents, pieces of copper which were only slightly tarnished and very dark, heavily tarnished copper coins were placed in bowls, which were numbered from 1 to 3 and which contained:

(1) an aqueous solution of oxalic acid and detergent. This is a product sold at present for treating copper;
(2) an aqueous solution of sulphuric acid and thiourea; and
(3) a solution according to the invention containing nitric acid and thiourea.

The following observations were subsequently made. The polish or shine of the slightly tarnished copper pieces was improved in all bowls, although the improvement obtained in bowl 1 was much smaller than that obtained in bowls 2 and 3. In the case of the highly discolored, brown coins, there was no discernible improvement in the coins placed in bowl 1. After a time lapse of about 60 seconds, a white coating formed on the surfaces of the coins in bowl 2, whereafter the copper was attacked and began to darken. In bowl 3, containing polish according to the invention, the surface of the now shiny coins did not become coated, and there was no discernible browning or dissolving of the metal.

The test shows that present day commercially available polishes for cleaning copper objects without vigorous polishing and rubbing being required, have no visible effect on highly browned surfaces. It has also been shown that the choice of acid in the polish is critical. Thus, sulphuric acid causes the surfaces of the object being cleaned to be coated with a white substance and, similar to phosphoric acid, is liable to dissolve metal from the surfaces of the object when said object remains immersed in the polish solution for a prolonged length of time, as previously indicated. The polish according to the invention has none of these negative effects, meaning that the polish can be in contact with the surfaces being cleaned for as long as is required to dissolve the tarnishing coatings, without risk of any metal being dissloved.

Similar results were obtained when test treating silver coins and also chromium-coated objects.

By way of summary, it can be pointed out that the polish according to the invention has the following advantages over known metal cleaning and polishing substances:

(1) acts rapidly;
(2) contact time is not critical, and hence can be selected as required without risk of attack on the metal;
3) no rubbing, polishing or metal manual action required, other than in the exceptional case of very old, heavily tarnished objects;
(4) no visible "dirt residues" are formed;
(5) intensive odors are much less noticeable; and
(6) can be used for both copper and silver surfaces without requiring the use of abrasives.

As will be understood, the invention can be modified within the scope of the claims, by adding thereto perfumes or substances which color the solution in a desired manner. Further, it may be necessary to add a wetting agent, to enable the polish to be more residly rinsed-off after treatment.

When using the polish according to the invention, the polish is preferably applied to the dirty surface with a wad of cotton wool, and left to work until the required shine is obtained, whereafter the object is rinsed with luke-warm water and a washing-up liquid. It is recommended that gloves are worn when applying the polish.

I claim:

1. A non-abrasive metal polish or cleaning agent for removing a discoloring film from objects while no visible residues are coated on the objects, particularly household objects and ornaments, having surfaces of copper, silver or chromium or of any alloy which is comprised predominately of any of these metals either separately or together, wherein the active ingredients of the polish consist of in manufacture an aqueous solution containing 1-3% by weight nitric acid, and 5-10% by weight thiourea or a derivative thereof.

2. A polish according to claim 1, characterized in that the aqueous solution contains about 2% by weight nitric acid and about 8% by weight thiourea.

* * * * *